(12) United States Patent
Higgins-Luthman

(10) Patent No.: US 9,187,028 B2
(45) Date of Patent: Nov. 17, 2015

(54) DRIVER ASSISTANCE SYSTEM FOR VEHICLE

(71) Applicant: MAGNA ELECTRONICS, INC., Auburn Hills, MI (US)

(72) Inventor: Michael J. Higgins-Luthman, Livonia, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 218 days.

(21) Appl. No.: 13/767,208

(22) Filed: Feb. 14, 2013

(65) Prior Publication Data

US 2013/0158796 A1 Jun. 20, 2013

Related U.S. Application Data

(63) Continuation of application No. 12/781,119, filed on May 17, 2010, now Pat. No. 8,376,595.

(60) Provisional application No. 61/178,565, filed on May 15, 2009.

(51) Int. Cl.
*G06F 7/00* (2006.01)
*B60Q 1/14* (2006.01)
(Continued)

(52) U.S. Cl.
CPC *B60Q 1/143* (2013.01); *B60Q 1/08* (2013.01); *B60Q 1/085* (2013.01); *H04N 7/18* (2013.01); *B60Q 2300/146* (2013.01); *B60Q 2300/312* (2013.01); *B60Q 2300/322* (2013.01); *B60Q 2300/33* (2013.01); *B60Q 2300/41* (2013.01);
(Continued)

(58) Field of Classification Search
CPC ...... B60Q 1/085; B60Q 1/08; B60Q 2300/33; B60Q 2300/331; B60Q 2300/40; B60Q 2300/41; B60Q 2300/42; B60Q 2300/45; B60Q 2300/47
USPC ............... 701/36, 49; 340/905, 523; 362/464, 362/466, 512, 523; 348/148; 315/82; 382/104
See application file for complete search history.

(56) References Cited

U.S. PATENT DOCUMENTS

| 5,182,502 A | 1/1993 | Slotkowski et al. |
| 5,184,956 A | 2/1993 | Langlais et al. |

(Continued)

FOREIGN PATENT DOCUMENTS

| WO | WO2008127752 | 10/2008 |
| WO | WO2009073054 | 6/2009 |

(Continued)

*Primary Examiner* — Thomas G Black
*Assistant Examiner* — Sze-Hon Kong
(74) *Attorney, Agent, or Firm* — Gardner, Linn, Burkhart & Flory, LLP

(57) ABSTRACT

A driver assistance system for a vehicle includes a camera and a control. The camera is disposed at the vehicle and views forward of the vehicle and is operable to capture image data. The control includes an image processor operable to process image data captured by the camera. The control, responsive at least in part to image data processing by the image processor, is operable to determine when the equipped vehicle is at least one of (i) approaching a construction zone, (ii) entering a construction zone and (iii) driving along a construction zone. The image data processing by the image processor may include at least one of (a) traffic sign recognition, (b) character recognition, (c) object detection, (d) object recognition, (e) spectral discrimination, (f) spatial recognition and (g) lane marker detection.

34 Claims, 2 Drawing Sheets

(51) Int. Cl.
  *B60Q 1/08* (2006.01)
  *H04N 7/18* (2006.01)

(52) U.S. Cl.
  CPC ......... *B60Q 2300/42* (2013.01); *B60Q 2300/45* (2013.01); *B60Q 2300/47* (2013.01)

(56) References Cited

U.S. PATENT DOCUMENTS

| | | |
|---|---|---|
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell et al. |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,567,360 A | 10/1996 | Varaprasad et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,715,093 A | 2/1998 | Schierbeek et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,823,654 A | 10/1998 | Pastrick et al. |
| 5,835,255 A | 11/1998 | Miles |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,910,854 A | 6/1999 | Varaprasad et al. |
| 5,914,815 A | 6/1999 | Bos |
| 5,923,027 A | 7/1999 | Stam et al. |
| 5,924,212 A | 7/1999 | Domanski |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,139,172 A | 10/2000 | Bos et al. |
| 6,144,022 A | 11/2000 | Tenenbaum et al. |
| 6,154,306 A | 11/2000 | Varaprasad et al. |
| 6,172,613 B1 | 1/2001 | DeLine et al. |
| 6,175,164 B1 | 1/2001 | O'Farrell et al. |
| 6,175,300 B1 | 1/2001 | Kendrick |

(56) References Cited

U.S. PATENT DOCUMENTS

| | | |
|---|---|---|
| 6,178,034 B1 | 1/2001 | Allemand et al. |
| 6,198,409 B1 | 3/2001 | Schofield et al. |
| 6,201,642 B1 | 3/2001 | Bos |
| 6,222,447 B1 | 4/2001 | Schofield et al. |
| 6,227,689 B1 | 5/2001 | Miller |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,323,942 B1 | 11/2001 | Bamji |
| 6,326,613 B1 | 12/2001 | Heslin et al. |
| 6,333,759 B1 | 12/2001 | Mazzilli |
| 6,341,523 B2 | 1/2002 | Lynam |
| 6,353,392 B1 | 3/2002 | Schofield et al. |
| 6,370,329 B1 | 4/2002 | Teuchert |
| 6,392,315 B1 | 5/2002 | Jones et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 * | 8/2002 | Naoi et al. ............... 382/104 |
| 6,433,676 B2 | 8/2002 | DeLine et al. |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,580,496 B2 | 6/2003 | Bamji et al. |
| 6,589,625 B1 | 7/2003 | Kothari et al. |
| 6,590,719 B2 | 7/2003 | Bos |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,636,258 B2 | 10/2003 | Strumolo |
| 6,648,477 B2 | 11/2003 | Hutzel et al. |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,819,231 B2 | 11/2004 | Berberich et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,882,287 B2 | 4/2005 | Schofield |
| 6,889,161 B2 | 5/2005 | Winner et al. |
| 6,891,563 B2 | 5/2005 | Schofield et al. |
| 6,902,284 B2 | 6/2005 | Hutzel et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,593 B2 | 2/2006 | Weller et al. |
| 7,004,606 B2 * | 2/2006 | Schofield ............... 362/460 |
| 7,005,974 B2 | 2/2006 | McMahon et al. |
| 7,012,727 B2 | 3/2006 | Hutzel et al. |
| 7,030,738 B2 * | 4/2006 | Ishii ............... 340/425.5 |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,425,076 B2 | 9/2008 | Schofield et al. |
| 7,446,650 B2 | 11/2008 | Scholfield et al. |
| 7,459,664 B2 | 12/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,526,103 B2 * | 4/2009 | Schofield et al. ............... 382/104 |
| 7,561,181 B2 | 7/2009 | Schofield et al. |
| 7,565,006 B2 | 7/2009 | Stam et al. |
| 7,581,859 B2 | 9/2009 | Lynam |
| 7,592,928 B2 | 9/2009 | Chinomi et al. |
| 7,613,327 B2 | 11/2009 | Stam et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,650,864 B2 | 1/2010 | Hassan et al. |
| 7,720,580 B2 | 5/2010 | Higgins-Luthman |
| 7,855,755 B2 | 12/2010 | Weller et al. |
| 7,881,496 B2 | 2/2011 | Camilleri et al. |
| 7,914,187 B2 | 3/2011 | Higgins-Luthman et al. |
| 7,965,336 B2 | 6/2011 | Bingle et al. |
| 8,027,029 B2 | 9/2011 | Lu et al. |
| 8,045,760 B2 | 10/2011 | Stam et al. |
| 8,058,977 B2 | 11/2011 | Lynam |
| 8,063,759 B2 | 11/2011 | Bos et al. |
| 8,184,159 B2 * | 5/2012 | Luo ............... 348/148 |
| 8,217,830 B2 | 7/2012 | Lynam |
| 8,254,635 B2 * | 8/2012 | Stein et al. ............... 382/103 |

(56) References Cited

U.S. PATENT DOCUMENTS

| | | |
|---|---|---|
| 8,314,689 B2 * | 11/2012 | Schofield et al. .......... 340/425.5 |
| 8,325,986 B2 * | 12/2012 | Schofield et al. ............. 382/104 |
| 8,376,595 B2 | 2/2013 | Higgins-Luthman |
| 8,379,923 B2 * | 2/2013 | Ishikawa ...................... 382/104 |
| 8,605,947 B2 * | 12/2013 | Zhang et al. ................. 382/104 |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0086153 A1 * | 5/2004 | Tsai et al. ..................... 382/104 |
| 2004/0114381 A1 | 6/2004 | Salmeen et al. |
| 2004/0128065 A1 | 7/2004 | Taylor et al. |
| 2004/0164228 A1 * | 8/2004 | Fogg et al. ................. 250/208.1 |
| 2004/0200948 A1 * | 10/2004 | Bos et al. ................... 250/208.1 |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2006/0018511 A1 | 1/2006 | Stam et al. |
| 2006/0018512 A1 * | 1/2006 | Stam et al. ................... 382/104 |
| 2006/0028731 A1 | 2/2006 | Schofield et al. |
| 2006/0050018 A1 | 3/2006 | Hutzel et al. |
| 2006/0061008 A1 | 3/2006 | Karner et al. |
| 2006/0091813 A1 * | 5/2006 | Stam et al. ...................... 315/82 |
| 2006/0103727 A1 | 5/2006 | Tseng |
| 2006/0164230 A1 | 7/2006 | DeWind et al. |
| 2006/0250501 A1 | 11/2006 | Widmann et al. |
| 2007/0023613 A1 | 2/2007 | Schofield et al. |
| 2007/0024724 A1 * | 2/2007 | Stein et al. ..................... 348/255 |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2007/0242339 A1 * | 10/2007 | Bradley ........................ 359/237 |
| 2008/0043099 A1 * | 2/2008 | Stein et al. ..................... 348/118 |
| 2008/0180529 A1 | 7/2008 | Taylor et al. |
| 2009/0113509 A1 | 4/2009 | Tseng et al. |
| 2009/0182690 A1 * | 7/2009 | Stein .............................. 706/12 |
| 2009/0208058 A1 * | 8/2009 | Schofield ........... G06K 9/00818 382/103 |
| 2009/0243824 A1 | 10/2009 | Peterson et al. |
| 2009/0244361 A1 | 10/2009 | Gebauer et al. |
| 2009/0295181 A1 | 12/2009 | Lawlor et al. |
| 2010/0020170 A1 | 1/2010 | Higgins-Luthman et al. |
| 2010/0045797 A1 | 2/2010 | Schofield et al. |
| 2010/0097469 A1 | 4/2010 | Blank et al. |
| 2010/0171642 A1 | 7/2010 | Hassan et al. |
| 2010/0172542 A1 * | 7/2010 | Stein .................. G06K 9/00798 382/103 |
| 2012/0019940 A1 | 1/2012 | Lu et al. |
| 2012/0062743 A1 | 3/2012 | Lynam et al. |
| 2012/0162427 A1 | 6/2012 | Lynam |
| 2013/0124038 A1 * | 5/2013 | Naboulsi ................. G06F 17/00 701/36 |
| 2014/0211013 A1 * | 7/2014 | Drummond et al. .......... 348/148 |

FOREIGN PATENT DOCUMENTS

| | | |
|---|---|---|
| WO | WO2010099416 | 9/2010 |
| WO | WO2011014497 | 2/2011 |

* cited by examiner

DRIVER ASSISTANCE SYSTEM FOR VEHICLE

The present application is a continuation of U.S. patent application Ser. No. 12/781,119, filed May 17, 2010, now U.S. Pat. No. 8,376,595, which claims the benefits of U.S. provisional application Ser. No. 61/785,565, filed May 15, 2009.

FIELD OF THE INVENTION

The present invention relates to automatic headlamp control systems for vehicles and, more particularly, to automatic headlamp control systems that automatically adjust the beam illumination state of a vehicle headlamp, such as between different beam illumination states, such as between higher and lower beam illumination states of the vehicle headlamps.

BACKGROUND OF THE INVENTION

Automotive forward lighting systems are evolving in several areas including the use of image-based sensors, typically referred to as Automatic High Beam (AHB) control systems, to maximize the use of high beam road illumination when appropriate, the use of steerable beam systems, typically referred to as Adaptive Front Lighting (AFL) systems, to provide a greater range of beam pattern options particularly for driving on curved roads or during turn maneuvers wherein the beam pattern may be biased or supplemented in the direction of the curve or turn, and the combination of such AHB and AFL systems.

Automatic high beam control system are known that utilize an optical system, an image sensor, and signal processing including spectral, spatial and temporal techniques to determine ambient lighting conditions, the road environment, and the presence of other road users in order to automatically control the selection of the appropriate forward lighting state such that user forward vision is optimized while minimizing the impact of headlamp caused glare on other road users in all lighting conditions. Examples of such systems are described in U.S. Pat. Nos. 5,796,094; 6,097,023; 6,320,176; 6,559,435; 6,831,261; 6,396,397; 6,822,563; and 7,004,606, which are hereby incorporated herein by reference in their entireties.

While AHB systems that utilize the features and concepts described within the above identified U.S. patents have achieved performance levels that have resulted in considerable commercial success, it is desired to provide additional features and techniques, which may increase the utility, improve the performance, facilitate the manufacture, and simplify the installation of such systems.

SUMMARY OF THE INVENTION

The present invention provides an automatic headlamp control system that is operable to automatically control or adjust the beam illumination state of a vehicle's headlamps, such as from one beam illumination state (such as a lower beam illumination state) to another or different beam illumination state (such as a higher beam illumination state). The headlamp control system is operable to determine when the vehicle is traveling along a substantially curved section of road, such as an on-ramp or off-ramp of an expressway or the like, and may adjust the image processing and/or headlamp beam illumination state decision responsive to such a determination. Optionally, the system may be operable to detect when the vehicle is approaching or entering or driving along a construction zone, and may adjust the headlamp beam illumination state decision or trigger/switch threshold responsive to such detection. Optionally, the system may be adjustable to tailor the image processing (such as by adjusting the algorithm or decision thresholds or the like) to the particular vehicle equipped with the headlamp control system and/or to the particular type of headlamp of the equipped vehicle, such as to more readily discern or discriminate between detected oncoming headlamps of approaching vehicles and reflections of light emitted by the headlamps of the equipped vehicle. Optionally, the system may be operable to determine if the camera or image sensor is blocked or partially blocked (such as by debris or dirt or ice or the like at the vehicle windshield), and may adjust the determination parameters depending on the location and/or driving conditions of the vehicle.

These and other objects, advantages, purposes and features of the present invention will become apparent upon review of the following specification in conjunction with the drawings.

DESCRIPTION OF THE PREFERRED EMBODIMENTS

Figure 1:
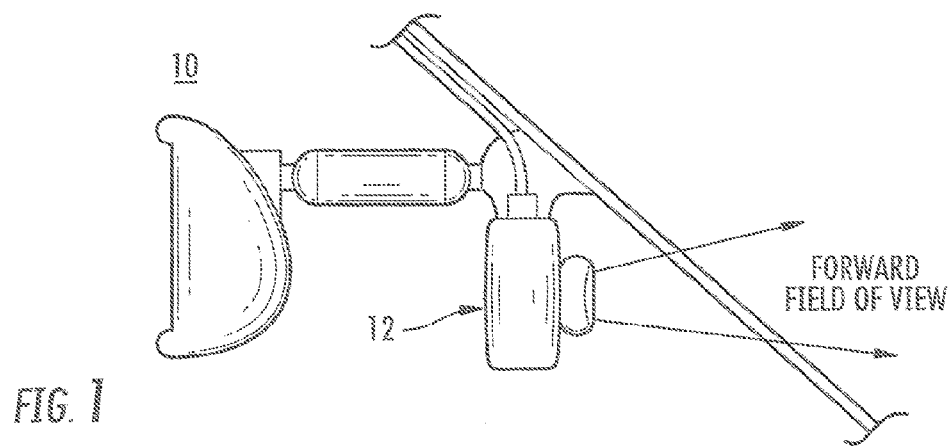
FIG. 1 is a side elevation of a portion of a vehicle embodying the present invention.
Figure 2:
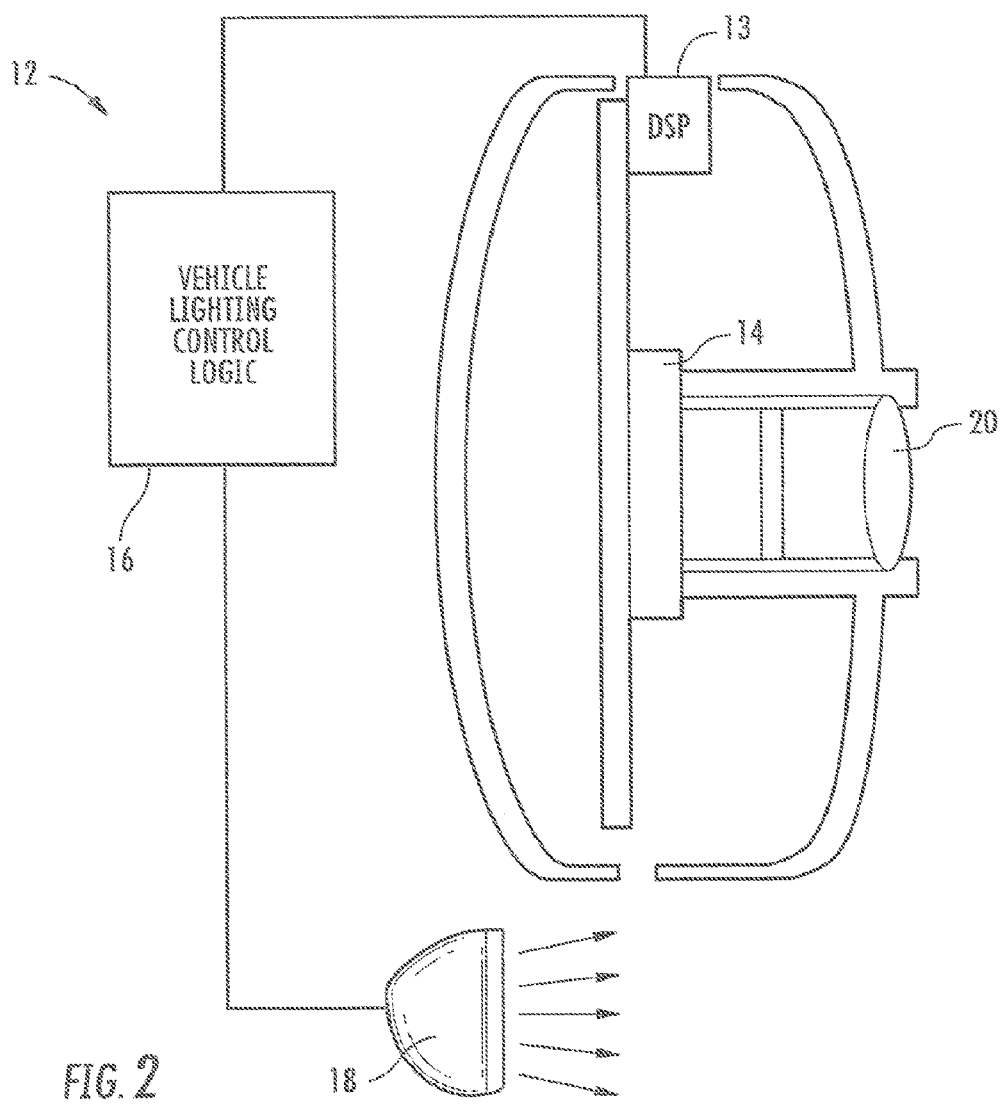
FIG. 2 is a partial side elevation view and block diagram of a vehicle headlight dimming control system according to the present invention.

Referring now to the drawings and the illustrative embodiments depicted therein, a vehicle 10 includes an automatic vehicle headlamp control system or vehicle headlamp dimming control system 12, which includes a forward facing camera or image sensor 14 that senses light from a scene forward of vehicle 10, an imaging processor or control circuit 13 that receives data from image sensor 14 and processes the image data, and a vehicle lighting control logic module 16 that exchanges data with control circuit 13 and controls the headlamps 18 (such as by changing or retaining the beam illumination state of the headlamps, such as between a higher beam state and a lower beam state) of vehicle 10 for the purpose of modifying the beam illumination state of the headlamps of the vehicle (FIGS. 1 and 2). The headlamps are operable to selectively emit a light output via a higher beam or high beam lighting element and a lower beam or low beam lighting element. Headlamp dimming control 12 is operable to determine whether light sources in the image captured by the image sensor are or may be indicative of headlamps of oncoming vehicles or taillights of leading vehicles and is operable to adjust the headlamps of the controlled vehicle between different beam illumination states (such as a higher beam state or high beam state and a lower beam state or low beam state) in response to such a determination. Headlamp dimming control 12 may utilize the principles disclosed in U.S. Pat. Nos. 5,796,094; 6,097,023; 6,320,176; 6,559,435; 6,831,261; 6,396,397; 6,822,563; and/or 7,004,606, which are hereby incorporated herein by reference in their entireties. Headlamp control 12 is operable to distinguish the light sources captured in the image between light sources representing headlamps and/or taillights of other vehicles, as discussed below.

The imaging sensor for the headlamp control of the present invention may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,498,620; 5,796,094; 6,097,023; 6,320,176; 6,559,435; 6,831,261; 6,806,452; 6,396,397; 6,822,563; 6,946,978; 7,038,577; and/or 7,004,606; and/or U.S. patent application Ser. No. 12/190,698, filed Aug. 13, 2008 and published Feb. 19, 2009 as U.S. Patent Publication No. US-2009-0045323, and/or U.S. patent application Ser. No. 11/315,675, filed Dec. 22, 2005 and published Aug. 17, 2006 as U.S. Patent Publication No. US-2006-0184297A1; and/or U.S. provisional application Ser. No. 61/083,222, filed Jul. 24, 2008; and/or PCT Application No. PCT/US2008/076022, filed Sep. 11, 2008, and published Mar. 19, 2009 as International Publication No. WO 2009036176, and/or PCT Application No. PCT/US2008/078700, filed Oct. 3, 2008, and published Apr. 9, 2009 as International Publication No. WO 2009/046268, and/or PCT Application No. PCT/US2007/075702, filed Aug. 10, 2007, and published Feb. 28, 2008 as PCT Publication No. WO 2008/024639, and/or PCT Application No. PCT/US2003/036177, filed Nov. 14, 2003, and published Jun. 3, 2004 as PCT Publication No. WO 2004/047421 A3, which are all hereby incorporated herein by reference in their entireties. The control 12 may include a lens element or optic 20 between the image sensor and the forward scene to substantially focus the scene at an image plane of the image sensor. Optionally, the optic may comprise an asymmetric optic, which focuses a generally central portion of the scene onto the image sensor, while providing classical distortion on the periphery of the scene or field of view. The imaging device and control and image processor may comprise any suitable components, and may utilize aspects of the vision systems of the text described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties. The imaging device and/or control may be part of or share components or circuitry with other image or imaging or vision systems of the vehicle, such as headlamp control systems and/or rain sensing systems and/or cabin monitoring systems and/or the like.

Such imaging sensors or cameras are pixelated imaging array sensors having a photosensing array 15 of a plurality of photon accumulating or photosensing light sensors or pixels 15a (FIG. 3), which are arranged in a two-dimensional array of rows and columns on a semiconductor substrate. The camera established on the substrate or circuit board includes circuitry which is operable to individually access each photosensor pixel or element of the array of photosensor pixels and to provide an output or image data set associated with the individual signals to the control circuit 13, such as via an analog to digital converter (not shown). As camera 14 receives light from objects and/or light sources in the target scene, the control circuit 13 may process the signal from at least some of the pixels to analyze the image data of the captured image.

Figure 3:
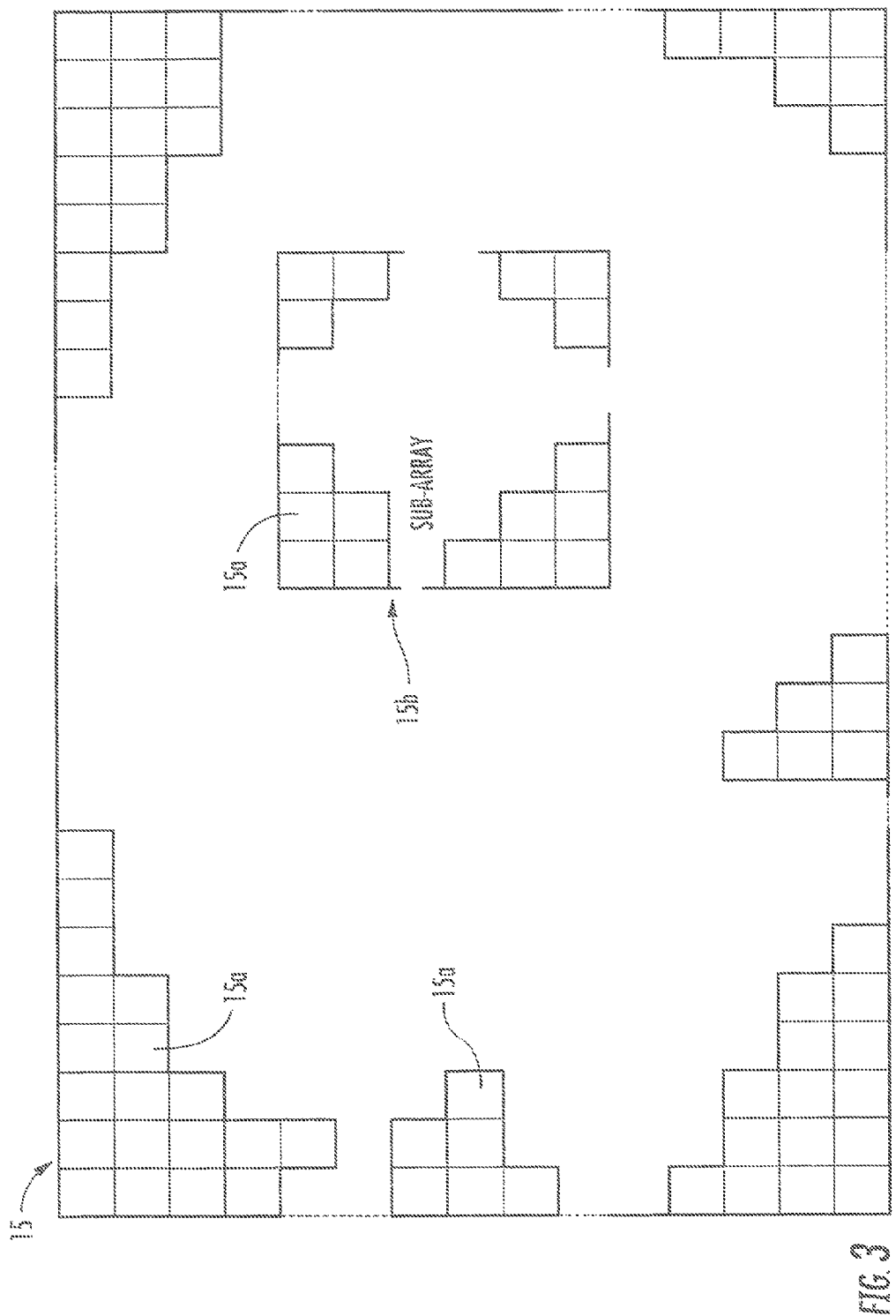
FIG. 3 is a schematic of an imaging array suitable for use with the control system of the present invention.

For example, and as shown in FIG. 3, the control may process one or more sub-arrays 15b of the photosensor array 15, where a particular sub-array may be representative of a zone or region of interest in the forward field of view of the camera. The control may process the sub-array of pixels while ignoring other pixels or processing other pixels at a reduced level (such as by utilizing aspects of the systems described in U.S. Pat. No. 7,038,577, which is hereby incorporated herein by reference in its entirety), and/or the control may process the sub-array of pixels in a particular manner (such as to determine if a light source is a vehicle lamp in the regions forward of the vehicle and near the host vehicle's path of travel, such as a headlamp of an oncoming vehicle in a lane adjacent to (such as to the left of) the host vehicle or other vehicle lamp forward and/or to the left or right of the host vehicle) while processing other sub-arrays or pixels in a different manner.

In order to take advantage of the environmental protection offered by the vehicle cabin, the frequently cleaned optically clear path offered by the vehicle windshield (which is cleaned or wiped by the windshield wipers when the wipers are activated), and the relatively high vantage point offered at the upper region or top of the windshield, the headlamp control system 12 or at least the imaging device or camera 14 is preferably mounted centrally at or near the upper inside surface of the front windshield of a vehicle and with a forward field of view through the region cleaned or wiped by the windshield wipers (such as shown in FIG. 1). The imaging device may be mounted at an interior rearview mirror assembly (such as at a mounting bracket or base of the mirror assembly) or at an accessory module or windshield electronics module (such as by utilizing aspects of the accessory modules described in U.S. Pat. Nos. 6,824,281 and/or 7,480,149, which are hereby incorporated herein by reference in their entireties) disposed at or near the interior rearview mirror assembly and at or near the interior surface of the vehicle windshield.

Optionally, and desirably, the control system may be operable to determine when there is a blockage or partial blockage in front of the forward facing camera or image sensor, such as when dirt or ice or snow or debris accumulates on the windshield in the area in front of the camera. The control system may be operable to determine if some or all of the pixels of the imaging array are blocked (such as via an object or dirt or debris at the vehicle windshield or the like) and may adapt the image processing accordingly or notify or alert the driver of the vehicle that such blockage has been detected. The blockage or partial blockage detection algorithm or algorithms may vary depending on the driving conditions or the like. For example, a partial or total daytime blockage algorithm may be run during daytime lighting conditions, such as in response to an ambient light sensor or a user input or on demand, while a partial or total nighttime blockage algorithm may be run when the ambient condition is indicative of nighttime lighting conditions, such as by utilizing aspects of the systems described in U.S. patent application Ser. No. 12/190,698, filed Aug. 13, 2008, now U.S. Pat. No. 8,017,898, which is hereby incorporated herein by reference in its entirety.

When the total blockage algorithm is run, the number of pixels above an intensity threshold may be counted for a captured image or frame, and if, over a number of captured frames, the count of the bright pixels is continuously below a threshold level, the control system may conclude that the imaging device is substantially or totally blocked. When the partial blockage algorithm is run, the control system may perform region-based processing to take into account intensity variations in different regions of the pixelated imaging array. Based on intensity variations with neighboring or adjacent regions and the continuity of the variations over time, the control may determine that the imaging array is partially blocked. The control system may process the blocked pixel region in a night mode to reduce or substantially preclude the possibility of a false blockage detection.

If either partial or total blockage is detected or determined, the system may adapt the image processing to accommodate the blocked pixels, or the system may alert the driver of the vehicle that the pixels are blocked so that the driver or user may unblock the imaging device (such as via cleaning the windshield of the vehicle), or the system may actuate the vehicle windshield wipers to clear the windshield at the imaging device or the like, or the system may actuate a blower system (such as a defogger system or the like) of the vehicle to direct or force or blow air toward the detected blockage to clear the windshield or window or area in the forward field of view of the imaging device. Optionally, the control system may detect that at least a portion of the imaging device or photosensor array is blocked and may switch to a lower or low beam mode in response to the blockage detection (so as to allow the system to confirm the existence of the blockage without the high beams on during this period of time), and the system may at least one of (a) alert the driver of the subject vehicle of the detected blockage so that he or she can clean the windshield or sensor or otherwise remove the blockage or actuate the wipers and/or related system of the vehicle to remove the blockage; (b) automatically actuate a wiper (such as the windshield wipers) of the vehicle to remove the blockage from the forward field of view of the imaging device; and (c) automatically actuate a blower system of the vehicle to remove or dissipate the blockage from the forward field of view. The control system may also detect that the blockage has been removed from the forward field of view and may resume the normal functionality of the headlamp control system and/or the wiper system of the vehicle and/or the blower system of the vehicle.

Optionally, the control system of the present invention may be operable to adjust or reconfigure the processing or algorithms for detecting sensor blockage in response to a low temperature detection (because ice or snow may linger at the camera location because the defrosting blower may not provide sufficient air flow at the camera to melt such ice and snow on the windshield at that location), in order to provide enhanced blockage detection during cold ambient temperature conditions where ice or snow may accumulate on the windshield in front of the sensor, and to limit high or higher beam actuation during conditions where the camera may be blocked and thus not detecting leading or oncoming vehicles. Such cold weather blockage of sensor may result in high beam flashing of other drivers as the camera or sensor detects nothing and the system concludes that no vehicles are present in front of the equipped vehicle.

Thus, the control system of the present invention may use an outside air temperature input and may switch to cold weather processing or a cold weather algorithm when the air temperature is detected to be below a threshold temperature (such as near 32 degrees F. or thereabouts), in order to enhance blockage detection of snow or ice that typically occurs in cold weather conditions. For example, the windshield may be blocked by frost or snow or ice from cold night temperatures, and the morning temperatures may be warmer than 32 degrees F., but the blockage may still remain, thus the threshold temperature may be close to, but above 32 degrees F. The control system may also monitor detection behavior and switch to a constant lower beam illumination state when the system detects evidence of poor or erroneous detection behavior. Optionally, for example, the control system may switch to an initial lower beam state when the temperature is below the threshold temperature level and may exit the initial lower beam state (or other situations where the system is operating at a constant lower beam illumination state) in response to monitoring of the detections when the monitoring evidences good or accurate detection behavior (and/or optionally following a period of time that should be sufficient for the vehicle climate control system to have melted any ice or snow that may be or may have been present on the windshield), whereby the system may return to normal automatic behavior or performance.

For example, the control system may be responsive to a temperature input that is indicative of the outside or ambient temperature at the vehicle. When the outside temperature falls below a specified or threshold level, the system may enable enhancements to the current blockage detection algorithms. For example, the system may enable more-aggressive blockage detection parameters (to transition to a 'blocked' state or mode quicker), or a delay time may be added to the 'blocked' state prior to enabling transition to the 'unblocked/ready' state. The minimum blockage time (the time a blockage or low light is detected by the sensor before the system recognizes a blocked or partially blocked condition) may be increased by an incremental amount each time the system transitions from its 'waiting to clear' state back to its 'blocked' state. Optionally, the system may count the number of blockage or weather mode events that occur over a period of time and may adjust the image processing and/or control of the headlamps in response to such counting.

When the temperature is above a specified or threshold level, the system may revert to standard or higher temperature blockage detection parameters, revert to standard "blocked to unblocked/ready" transition delay, and/or suspend counting of the number of blockage or weather mode events that occur over a period of time (but the system may not clear the count). If a temperature signal is not received by the control system, the control system or algorithms may default to their normal operation (in other words, the system may interpret a "no temperature signal" in the same manner as a temperature signal that is indicative of a detected temperature that is greater than the low temperature threshold).

When a specified or threshold number of blockage or weather mode events occur, the control system may adjust or configure the transition to the 'blocked' state or mode for the remainder of the ignition cycle of the equipped vehicle (if the duration threshold or time period is set to the vehicle ignition cycle) or until the detected ambient temperature is greater than a high temperature threshold (if the duration threshold is set to a temperature threshold). The number of blockages and weather events may be reset with every power-on reset of the vehicle and/or control system.

If the temperature blockage detection configuration is enabled, the control system will not perform automatic high beam activations when the temperature falls below a specified or threshold level. In such applications, the system may return or be switched to automatic control of the headlamps when the detected temperature is greater than a higher temperature threshold (a temperature threshold that is greater than the low temperature threshold that triggers a switch to a constant lower beam illumination state). The temperature shutdown status may be reset with each power-on reset of the vehicle and/or system.

Optionally, the system may include a blockage detection 'supervisory' algorithm (configurable on/off) that is operable to monitor a degradation in detection distances and transition to the 'blocked' state after a specified configurable number of 'short' detections. While in the 'blocked' state, the system may continue to monitor detection distances and transition to the 'unblocked' state after a specified configurable number of 'long' detections. When the supervisory algorithm is configured or activated or on, the supervisory algorithm may run continuously, independent of the "outside air temperature" signal and the "temperature blockage duration" setting. Optionally, additional supplier-range DIDs may be added for the threshold number of 'short' detections required prior to transitioning to the 'blocked' state, to define the parametric 'short' detection threshold, while such DI Ds may be added for the threshold number of 'long' detections required prior to transitioning out of the 'blocked' state, to define the parametric 'long' detection threshold.

Optionally, the control system may include other blockage detection algorithms or parameters depending on the driving conditions of the vehicle. For example, during end of line vehicle testing at a vehicle assembly plant, the vehicle is "driven" on rollers to check engine performance and the like. When a vehicle equipped with a headlamp control system of the types described herein is so tested, the control system may falsely or erroneously detect a partial blockage condition due to the low lighting conditions at the assembly plant and the "driving" of the vehicle on the rollers (which the system may detect as the vehicle being driven along a road while the image sensor detects the same low light pattern, which may be indicative of a blocked or partially blocked sensor), whereby the system may switch to the lower beam illumination state. Such false blockage detections may result in warranty issues and/or further testing and evaluation of the vehicle and/or headlamp control system.

Thus, the automatic headlamp control system of the present invention may utilize a blockage detection algorithm that is tuned to recognize such a condition and not generate a false blockage detection during such end of line testing. For example, the control system may process the captured image data for different parameters to reduce the possibility of a false blockage detection, such as by altering the comparison of different regions or areas of the captured image data during such testing. Optionally, the system may function to limit blockage testing during an initial start-up period or the like.

As discussed above, during normal vehicle operation, the headlamp control system is operable to adjust the beam illumination state of the vehicle headlamps responsive to processing of the image data captured by the forward facing camera. Optionally, the control system may adjust the decision thresholds or parameters responsive to the image processing or responsive to other inputs. For example, the control system may adjust the image processing responsive to a determination that the equipped vehicle is traveling along a curved road or section of road that is indicative of or representative of an on-ramp or off-ramp of an expressway or freeway or the like.

During normal driving conditions (such as along a road having leading traffic ahead of the equipped vehicle and oncoming traffic ahead of and in a lane adjacent to the lane traveled by the equipped vehicle), the control system may switch to the higher beam state responsive to a determination that there are no leading or oncoming vehicles ahead of the equipped vehicle (by determining if detected light sources in the field of view ahead of the equipped vehicle are headlamps or taillights of other vehicles). The switch to the higher beam state may occur following a period of time during which no oncoming headlamps or leading taillights are detected by the control system (to reduce the possibility of rapid switching of the headlamp state between the higher and lower beam states).

When the vehicle equipped with headlamp control system 12 is driven along a curved section of road, such as a curved on-ramp or off-ramp of a freeway or expressway, taillights of leading vehicles may not be detected by the forward facing camera 14 of the equipped vehicle 10, because the leading vehicle may be far enough ahead of the equipped vehicle along the curved road so that the leading taillights are outside of the field of view of the forward facing camera. In such a driving condition or situation, it is desirable to limit switching to the higher beam illumination state of the headlamps of the equipped vehicle because the higher beam illumination may be bothersome to a driver of an undetected leading vehicle that is ahead of the equipped vehicle along the curved road.

Thus, the automatic headlamp control system of the present invention is operable to detect the driving conditions (such as the road curvature and/or steering wheel angle) and, responsive to a detection of a driving condition representative of a substantial curve in the road (such as a curve that results in the vehicle changing direction by about 270 degrees or thereabouts, which may be indicative of a freeway on-ramp or off-ramp or the like), may adjust the decision threshold to limit or delay switching to a different beam illumination state, such as from a lower beam state to a higher beam state. For example, the system may determine the road curvature responsive to image processing (where the camera may capture lane markers or the like along the center or side of the road surface) or a steering wheel sensor (that detects the steering wheel angle and/or turning angle of the vehicle and/or that may detect or determine that the vehicle is turning at a substantial turning angle or maintains a similar turning angle for a substantial distance or period of time) or a global positioning system (GPS) or navigational system or the like (that detects a geographical location of the vehicle and can determine if the vehicle is on an on-ramp or off-ramp or the like and/or that may determine the turning radius of the vehicle and/or the distance or period of time during which the vehicle is traveling at such a turning radius). When a threshold degree of road curvature is detected (such as a threshold turning radius and/or threshold distance along which the vehicle travels along a detected curved section of road), the control system may limit or delay switching to a higher beam state such that the headlamps of the equipped vehicle remain in the lower beam state during the turn (such as until the vehicle completes the turn or the steering wheel angle is returned toward a zero angle or straight path of travel) to limit or substantially preclude glare to a driver of a vehicle that may be in front of the equipped vehicle (yet outside of the field of view of the forward facing camera of the equipped vehicle) along the curved road or section of road.

Optionally, the headlamp control system may be operable to adjust the threshold switching parameter responsive to a situation where a detected taillight moves to one side of the equipped vehicle (such as to the right side as the leading vehicle travels along a curve to the right) and when such detected movement and subsequent non-detection of the leading vehicle taillights is followed by a detection or determination that the equipped vehicle is traveling along a curvature in the road (such as a curve to the right and thus following the direction that the leading vehicle was last headed when still detected by the system), whereby the control system may limit the switching to the higher beam illumination state due to the likelihood that the leading vehicle is still ahead of the equipped vehicle, but is not detectable along the road curvature. Such a delayed or limited high beam switching function provides enhanced performance of the headlamp control system and limits activating the higher beam illumination state in situations where such activation would lead to glare to the driver of a leading vehicle.

Optionally, the automatic headlamp control system may be operable to detect when the equipped vehicle is approaching or entering or driving through a construction zone, such as responsive to traffic sign recognition (such as by detecting orange signs or the like) or character recognition (such as by determining that a detected sign includes characters or indicia or text that is/are indicative of the vehicle approaching or driving through or along a construction zone) or object detection and recognition (such as detection and identification of barrels or cones or the like that are typically disposed at construction zones) or spectral recognition (such as by recognizing or discriminating between orange and red) or spatial recognition (such as by recognizing or discerning construction zone signs by the location and/or number of signs along the side of the road being traveled) or the like. If the system detects that the equipped vehicle is at or in a construction zone and does not detect taillights of leading vehicles ahead of the equipped vehicle, the system may switch the headlamps to a different beam illumination state, such as to a higher beam illumination state.

Because construction zone signs are typically orange, they present potential difficulties to the system in discriminating between the construction zone signs and taillights of leading vehicles (which are red) when reflection off of the signs is detected at a distance ahead of the equipped vehicle. Thus, the image processing may be operable to discriminate between reflection of light off an orange sign and red light emitted by a vehicle taillight, and may make such a determination based on the color of the detected light source or object, the location of the detected light source or object relative to the equipped vehicle, a recognition of a reflection of the headlamps of the equipped vehicle (such as by superimposing a signature or code or pattern on an output of the headlamps of the equipped vehicle such as described in U.S. Pat. No. 7,004,606, which is hereby incorporated herein by reference in its entirety), or the like. Optionally, for example, the headlamp control system may detect a construction zone by any of the above approaches and/or via an output of a traffic sign recognition (TSR) system (that identifies construction zone signs), a lane departure warning (LDW) system (that may identify traffic shifts or lane changes and/or the like along a construction zone), a forward collision warning system or object detection system (that may identify objects of interest ahead of the equipped vehicle, such as traffic cones and/or barrels and/or the like that are typically disposed at construction zones), a GPS and/or navigating system (that may identify when the detected geographic location of the vehicle corresponds to a construction zone) and/or the like. When it is detected or determined that the vehicle is approaching or at or in a construction zone, the system may discriminate between orange construction zone signs and leading taillights and may readily switch (so long as no leading taillights or oncoming headlamps are detected by the control system) to the higher beam illumination state (or remain at the higher beam illumination state) to provide enhanced illumination to the driver of the equipped vehicle while the equipped vehicle is driving through or along the construction zone. When the system subsequently detects that the equipped vehicle is exiting the construction zone, the headlamp control system may return to its normal operation and function to switch the beam illumination state between higher and lower beam illumination states responsive to detection of oncoming headlamps and/or leading taillights.

Optionally, automatic headlamp control system 12 may be operable to adjust the image processing to tailor or tune the image processing to the particular vehicle that is equipped with the automatic headlamp control system. For example, a common or universal automatic headlamp control system may be provided by a headlamp control system manufacturer or supplier (and such a common headlamp control system may be provided or supplied to one or more vehicle manufacturers for implementation on two or more vehicle programs), and the system may be adjusted or preset to a particular processing level or regime, depending on the type of headlamps used by the vehicle that is eventually equipped with the headlamp control system. The control system thus may be programmed or configured or adjusted, such as at a vehicle assembly plant or such as at a dealership or at an aftermarket installation facility or the like, to correlate the system with the type of headlamps (such as halogen headlamps, HID headlamps, light emitting diodes, and/or the like) of the equipped vehicle. For example, the calibration parameters for the control system (such as the decision making or switching parameters) may be selected depending on the type of headlamps of the vehicle.

Such an adjustment or configuration of the image processor and/or control enhances the system's ability to recognize reflections of light emitted by the equipped vehicle's headlamps and to discern such reflections from headlamps of other vehicles and/or taillights of other vehicles. For example, for headlamps that have a particular spectral signature, the control system or image processor may be configured (such as during an end of line calibration at the vehicle assembly plant) to tune the image processing to the equipped vehicle's headlamp color spectrum. The control system thus may be more sensitive (or less sensitive) to particular spectral regions and may be tuned or configured to recognize the equipped vehicle's headlamp spectral signature to enhance recognition of reflections of the equipped vehicle's headlamps off signs and the like. The system thus may be adjusted or configured to better detect red taillights by adjusting or tuning the system for the particular headlamps (since some types of headlamps may output more or less light in the red spectrum range than other types of headlamps).

Changes and modifications to the specifically described embodiments may be carried out without departing from the principles of the present invention, which is intended to be limited only by the scope of the appended claims as interpreted according to the principles of patent law including the doctrine of equivalents.

What is claimed is:

1. A driver assistance system for a vehicle, said driver assistance system comprising:

a camera disposed at a vehicle equipped with said driver assistance system, wherein said camera views forward of the equipped vehicle and wherein said camera is operable to capture image data;

a control device comprising an image processor;

wherein said image processor is operable to process image data captured by said camera;

wherein, responsive to processing of captured image data by said image processor, said driver assistance system is operable to adjust a light beam emitted by a headlamp of the equipped vehicle;

wherein said control device, responsive at least in part to image data processing by said image processor, is operable to determine when the equipped vehicle is at least one of (i) approaching a construction zone, (ii) entering a construction zone and (iii) driving along a construction zone;

wherein image data processing by said image processor comprises at least one of (a) traffic sign recognition, (b) character recognition, (c) object detection, (d) object recognition, (e) spectral discrimination, (f) spatial recognition and (g) lane marker detection;

wherein determination that the equipped vehicle is at least one of (i) approaching a construction zone, (ii) entering a construction zone and (iii) driving along a construction zone comprises spectral recognition of an orange construction sign;

wherein, responsive to determination that the equipped vehicle is at least one of (i) approaching a construction zone, (ii) entering a construction zone and (iii) driving along a construction zone, said control device enters an enhanced mode that enhances image processing of captured image data by said image processor to discriminate orange construction zone signs from taillights of leading vehicles so as to adjust the light beam emitted by the headlamp of the equipped vehicle to a higher beam state when no taillights of leading vehicles are present; and wherein, responsive to determination of the equipped vehicle exiting the construction zone, said control device returns to a normal mode to adjust the light beam emitted by the headlamp of the equipped vehicle responsive to determination of headlamps of approaching vehicles and taillights of leading vehicles.

2. The driver assistance system of claim 1, wherein, responsive at least in part to said control device determining that the equipped vehicle is at least one of (i) approaching a construction zone, (ii) entering a construction zone and (iii) driving along a construction zone, said driver assistance system is operable to adjust the light beam emitted by the headlamp of the equipped vehicle.

3. The driver assistance system of claim 2, wherein said adjustment of the light beam comprises changing a beam state of the light beam emitted by the headlamp of the equipped vehicle.

4. The driver assistance system of claim 1, wherein said driver assistance system is operable to recognize a construction zone sign.

5. The driver assistance system of claim 1, wherein said driver assistance system is operable to recognize at least one of (i) cones indicative of a construction zone, (ii) barrels indicative of a construction zone and (iii) a traffic shift.

6. The driver assistance system of claim 1, wherein, at least when said image processing of captured image data is operating in said enhanced mode, said driver assistance system is operable to discriminate orange from red.

7. The driver assistance system of claim 6, wherein said driver assistance system, at least when said image processing of captured image data is operating in said enhanced mode, is operable to discriminate between reflection of light off an orange sign and red light emitted by a vehicle taillight.

8. The driver assistance system of claim 7, wherein said driver assistance system, at least when said image processing of captured image data is operating in said enhanced mode, is operable to discriminate between reflection of light off an orange sign and red light emitted by a taillight of a leading vehicle based on at least one of (i) the color of the detected light source, (ii) the location of the detected light source relative to the equipped vehicle, (iii) recognition of a reflection of the headlamps of the equipped vehicle and (iv) recognition of a reflection of the headlamps of the equipped vehicle by superimposing a pattern on an output of the headlamps of the equipped vehicle.

9. The driver assistance system of claim 1, wherein said driver assistance system is operable to recognize construction zone signs by at least one of (i) a location of signs along the road traveled by the equipped vehicle and (ii) a number of signs along the road traveled by the equipped vehicle.

10. The driver assistance system of claim 1, wherein said control device, responsive at least in part to at least one of (i) a global positioning system of the equipped vehicle and (ii) a navigation system of the equipped vehicle, is operable to identify when the current geographic location of the equipped vehicle corresponds to a construction zone.

11. The driver assistance system of claim 1, wherein said control device is operable to determine that the equipped vehicle is at least one of (i) approaching a construction zone, (ii) entering a construction zone and (iii) driving along a construction zone responsive at least in part to (a) a traffic sign recognition system of the equipped vehicle, (b) a lane departure warning system of the equipped vehicle, (c) a forward collision warning system of the equipped vehicle, (d) an object detection system of the equipped vehicle, (e) a global positioning system of the equipped vehicle and (f) a navigation system of the equipped vehicle.

12. The driver assistance system of claim 1, wherein said image processor processes image data captured by said camera for at least one of (a) a traffic sign recognition system of the equipped vehicle, (b) a lane departure warning system of the equipped vehicle, (c) a forward collision warning system of the equipped vehicle and (d) an object detection system of the equipped vehicle.

13. The driver assistance system of claim 1, wherein said camera views through the windshield of the equipped vehicle.

14. The driver assistance system of claim 13, wherein said camera is disposed at one of (i) an interior rearview mirror assembly of the equipped vehicle and (ii) a windshield electronics module of the equipped vehicle.

15. The driver assistance system of claim 13, wherein said camera views through the windshield of the equipped vehicle at a location that is swept by a windshield wiper of the equipped vehicle.

16. A driver assistance system for a vehicle, said driver assistance system comprising:

a camera disposed at a vehicle equipped with said driver assistance system, wherein said camera views forward of the equipped vehicle through the windshield of the equipped vehicle and wherein said camera is operable to capture image data;

a control device comprising an image processor;

wherein said image processor is operable to process image data captured by said camera;

wherein, responsive to processing of captured image data by said image processor, said driver assistance system is operable to adjust a light beam emitted by a headlamp of the equipped vehicle;

wherein said control device, at least in part responsive to image data processing by said image processor, is operable to determine when the equipped vehicle is at least one of (i) approaching a construction zone, (ii) entering a construction zone and (iii) driving along a construction zone;

wherein image data processing by said image processor comprises at least one of (a) traffic sign recognition, (b) character recognition, (c) object detection, (d) object recognition, (e) spectral discrimination, (f) spatial recognition and (g) lane marker detection;

wherein said image processor processes image data captured by said camera for at least one of (a) a traffic sign recognition system of the equipped vehicle, (b) a lane departure warning system of the equipped vehicle, (c) a forward collision warning system of the equipped vehicle and (d) an object detection system of the equipped vehicle;

wherein determination that the equipped vehicle is at least one of (i) approaching a construction zone, (ii) entering a construction zone and (iii) driving along a construction zone comprises spectral recognition of an orange construction sign;

wherein, responsive to determination that the equipped vehicle is at least one of (i) approaching a construction zone, (ii) entering a construction zone and (iii) driving along a construction zone, said control device enters an enhanced mode that enhances image processing of captured image data by said image processor to discriminate orange construction zone signs from taillights of leading vehicles so as to adjust the light beam emitted by the headlamp of the equipped vehicle to a higher beam state when no taillights of leading vehicles are present; and wherein, responsive to determination of the equipped vehicle exiting the construction zone, said control device returns to a normal mode to adjust the light beam emitted by the headlamp of the equipped vehicle responsive to determination of headlamps of approaching vehicles and taillights of leading vehicles.

17. The driver assistance system of claim 16, wherein, responsive at least in part to said control device determining that the equipped vehicle is at least one of (i) approaching a construction zone, (ii) entering a construction zone and (iii) driving along a construction zone, said driver assistance system is operable to adjust the light beam emitted by the headlamp of the equipped vehicle.

18. The driver assistance system of claim 17, wherein said driver assistance system is operable to recognize at least one of (i) cones indicative of a construction zone, (ii) barrels indicative of a construction zone and (iii) a traffic shift.

19. The driver assistance system of claim 16, wherein said driver assistance system is operable to recognize a construction zone sign.

20. The driver assistance system of claim 16, wherein said driver assistance system, at least when said image processing of captured image data is operating in said enhanced mode, is operable to discriminate orange from red.

21. The driver assistance system of claim 20, wherein said driver assistance system, at least when said image processing of captured image data is operating in said enhanced mode, is operable to discriminate between reflection of light off an orange sign and red light emitted by a taillight of a leading vehicle based on at least one of (i) the color of the detected light source, (ii) the location of the detected light source relative to the equipped vehicle, (iii) recognition of a reflection of the headlamps of the equipped vehicle and (iv) recognition of a reflection of the headlamps of the equipped vehicle by superimposing a pattern on an output of the headlamps of the equipped vehicle.

22. The driver assistance system of claim 16, wherein said control device, responsive at least in part to at least one of (i) a global positioning system of the equipped vehicle and (ii) a navigation system of the equipped vehicle, is operable to identify when the current geographic location of the equipped vehicle corresponds to a construction zone.

23. The driver assistance system of claim 16, wherein at least one of (i) said camera is disposed at an interior rearview mirror assembly of the equipped vehicle, (ii) said camera is disposed at a windshield electronics module of the equipped vehicle and (iii) said camera views through the windshield of the equipped vehicle at a location that is swept by a windshield wiper of the equipped vehicle.

24. A driver assistance system for a vehicle, said driver assistance system comprising:

a camera disposed at a vehicle equipped with said driver assistance system, wherein said camera views forward of the equipped vehicle through the windshield of the equipped vehicle at a location that is swept by a windshield wiper of the equipped vehicle and wherein said camera is operable to capture image data;

a control device comprising an image processor;

wherein said image processor is operable to process image data captured by said camera;

wherein, responsive to processing of captured image data by said image processor, said driver assistance system is operable to adjust a light beam emitted by a headlamp of the equipped vehicle;

wherein said control device, responsive at least in part to image data processing by said image processor, is operable to determine when the equipped vehicle is at least one of (i) approaching a construction zone, (ii) entering a construction zone and (iii) driving along a construction zone;

wherein image data processing by said image processor comprises at least one of (a) traffic sign recognition, (b) character recognition, (c) object detection, (d) object recognition, (e) spectral discrimination, (f) spatial recognition and (g) lane marker detection;

wherein determination that the equipped vehicle is at least one of (i) approaching a construction zone, (ii) entering a construction zone and (iii) driving along a construction zone comprises spectral recognition of an orange construction sign;

wherein said driver assistance system is operable to recognize at least one of (i) cones indicative of a construction zone, (ii) barrels indicative of a construction zone and (iii) a traffic shift;

wherein, responsive to determination that the equipped vehicle is at least one of (i) approaching a construction zone, (ii) entering a construction zone and (iii) driving along a construction zone, said control device enters an enhanced mode that enhances image processing of captured image data by said image processor to discriminate orange construction zone signs from taillights of leading vehicles so as to adjust the light beam emitted by the headlamp of the equipped vehicle to a higher beam state when no taillights of leading vehicles are present; and wherein, responsive to determination of the equipped vehicle exiting the construction zone, said control device returns to a normal mode to adjust the light beam emitted by the headlamp of the equipped vehicle responsive to determination of headlamps of approaching vehicles and taillights of leading vehicles.

25. The driver assistance system of claim 24, wherein said image processor processes image data captured by said camera for at least one of (a) a traffic sign recognition system of the equipped vehicle, (b) a lane departure warning system of the equipped vehicle, (c) a forward collision warning system of the equipped vehicle and (d) an object detection system of the equipped vehicle.

26. The driver assistance system of claim 24, wherein, responsive at least in part to said control device determining that the equipped vehicle is at least one of (i) approaching a construction zone, (ii) entering a construction zone and (iii) driving along a construction zone, said driver assistance system is operable to adjust the light beam emitted by the headlamp of the equipped vehicle.

27. The driver assistance system of claim 24, wherein said driver assistance system is operable to recognize a construction zone sign.

28. The driver assistance system of claim 24, wherein said driver assistance system, at least when said image processing of captured image data is operating in said enhanced mode, is operable to discriminate orange from red.

29. The driver assistance system of claim 24, wherein said control device, responsive at least in part to at least one of (i) a global positioning system of the equipped vehicle and (ii) a navigation system of the equipped vehicle, is operable to identify when the current geographic location of the equipped vehicle corresponds to a construction zone.

30. A driver assistance system for a vehicle, said driver assistance system comprising:
- a camera disposed at a vehicle equipped with said driver assistance system, wherein said camera views forward of the equipped vehicle through the windshield of the equipped vehicle and wherein said camera is operable to capture image data;
- a control device comprising an image processor;
- wherein said image processor is operable to process image data captured by said camera;
- wherein, responsive to processing of captured image data by said image processor, said driver assistance system is operable to adjust a light beam emitted by a headlamp of the equipped vehicle;
- wherein said control device, responsive at least in part to image data processing by said image processor, is operable to determine when the equipped vehicle is at least one of (i) approaching a construction zone, (ii) entering a construction zone and (iii) driving along a construction zone;
- wherein said image processor processes image data captured by said camera for at least one of (a) a traffic sign recognition system of the equipped vehicle, (b) a lane departure warning system of the equipped vehicle, (c) a forward collision warning system of the equipped vehicle and (d) an object detection system of the equipped vehicle;
- wherein determination that the equipped vehicle is at least one of (i) approaching a construction zone, (ii) entering a construction zone and (iii) driving along a construction zone comprises spectral recognition of an orange construction sign;
- wherein, responsive to determination that the equipped vehicle is at least one of (i) approaching a construction zone, (ii) entering a construction zone and (iii) driving along a construction zone, said control device enters an enhanced mode that enhances image processing of captured image data by said image processor to discriminate orange construction zone signs from taillights of leading vehicles so as to adjust the light beam emitted by the headlamp of the equipped vehicle to a higher beam state when no taillights of leading vehicles are present; and
- wherein, responsive to determination of the equipped vehicle exiting the construction zone, said control device returns to a normal mode to adjust the light beam emitted by the headlamp of the equipped vehicle responsive to determination of headlamps of approaching vehicles and taillights of leading vehicles.

31. The driver assistance system of claim 30, wherein, responsive at least in part to said control device determining that the equipped vehicle is at least one of (i) approaching a construction zone, (ii) entering a construction zone and (iii) driving along a construction zone, said driver assistance system is operable to adjust the light beam emitted by the headlamp of the equipped vehicle.

32. The driver assistance system of claim 30, wherein said driver assistance system is operable to recognize a construction zone sign.

33. The driver assistance system of claim 30, wherein said driver assistance system, at least when said image processing of captured image data is operating in said enhanced mode, is operable to discriminate orange from red.

34. The driver assistance system of claim 30, wherein said driver assistance system is operable to recognize at least one of (i) cones indicative of a construction zone, (ii) barrels indicative of a construction zone and (iii) a traffic shift.

\* \* \* \* \*